United States Patent
Yajima (10) Patent No.: US 9,970,346 B2
(45) Date of Patent: May 15, 2018

(54) THERMOACTUATOR AND ATTACHMENT STRUCTURE THEREOF

(71) Applicant: Nippon Thermostat Co., Ltd., Tokyo (JP)

(72) Inventor: Noriyasu Yajima, Tokyo (JP)

(73) Assignee: NIPPON THERMOSTAT CO., LTD., Tokyo (JP)

(*) Notice: Subject to any disclaimer, the term of this patent is extended or adjusted under 35 U.S.C. 154(b) by 127 days.

(21) Appl. No.: 15/038,525

(22) PCT Filed: Oct. 3, 2014

(86) PCT No.: PCT/JP2014/076582
§ 371 (c)(1),
(2) Date: May 23, 2016

(87) PCT Pub. No.: WO2015/083431
PCT Pub. Date: Jun. 11, 2015

(65) Prior Publication Data
US 2016/0298525 A1    Oct. 13, 2016

(30) Foreign Application Priority Data

Dec. 2, 2013 (JP) ................................. 2013-249493

(51) Int. Cl.
*F03G 7/06* (2006.01)
*F01P 7/12* (2006.01)

(52) U.S. Cl.
CPC . *F01P 7/12* (2013.01); *F03G 7/06* (2013.01)

(58) Field of Classification Search
CPC ....................................................... F03G 7/06
(Continued)

(56) References Cited

U.S. PATENT DOCUMENTS 3,014,467 A * 12/1961 Middendorf .............. F01P 7/16
123/41.1
2001/0018832 A1 * 9/2001 Matsunaga ........ B60H 1/00485
62/239
2012/0103707 A1   5/2012 Hureaux et al.

FOREIGN PATENT DOCUMENTS

DE    3013386 A1 * 10/1981 ............... F03G 7/06
JP    50-16387 U    2/1975
(Continued)

OTHER PUBLICATIONS

International Search Report for Application No. PCT/JP2014/076582 dated Dec. 22, 2014.

*Primary Examiner* — Laert Dounis
(74) *Attorney, Agent, or Firm* — Isshiki International Law Office; Joseph P. Farrar, Esq.

(57) ABSTRACT

A thermoactuator easily installed in an object without compromising the operating characteristics of the thermo-element has an element case, containing wax that expands and contracts with changes in temperature; a supporting portion attached at one end to the element case by crimping, slidably supporting a shaft at another end; a cylindrical casing having an opening in one end, at least a portion of the supporting portion pressed through the opening in the one end of the cylindrical casing; and a flange expanding outward from the one end of the cylindrical casing, in which through-holes are formed for mounting the thermoactuator to an object to which the thermoactuator is to be attached. The element case is supported by one end of the supporting portion housed within the object to which the thermoactuator is to be attached and the casing is mounted on the object via the flange.

2 Claims, 8 Drawing Sheets (58) Field of Classification Search
USPC .................................................. 60/527, 528
See application file for complete search history.

(56) References Cited

FOREIGN PATENT DOCUMENTS

| | | | |
|---|---|---|---|
| JP | 61-99631 U | | 6/1986 |
| JP | 62168918 | | 7/1987 |
| JP | 09210242 A | * | 8/1997 |
| JP | 2001315524 A | | 11/2001 |
| JP | 2006274898 A | | 10/2006 |
| JP | 2013231392 A | | 11/2013 |
| WO | 94013952 A1 | | 6/1994 |

* cited by examiner

PRIOR ART

PRIOR ART FIG. 9

THERMOACTUATOR AND ATTACHMENT STRUCTURE THEREOF

CROSS-REFERENCE TO RELATED APPLICATION

This application is a national phase entry under 35 U.S.C. § 371 of International Application No. PCT/JP2014/076582, filed Oct. 3, 2014, published in Japanese, which claims priority to Japan Patent Application No. 2013-249493, filed on Dec. 2, 2013, the disclosures of which are incorporated herein by reference.

TECHNICAL FIELD

The present disclosure relates to a thermoactuator and an attachment structure thereof, and more particularly, to a thermoactuator attached to on an engine, for example, that causes a shaft to move back and forth by expansion and contraction of wax induced by changes in temperature of an engine, and an attachment structure thereof.

BACKGROUND ART

Figure 8:
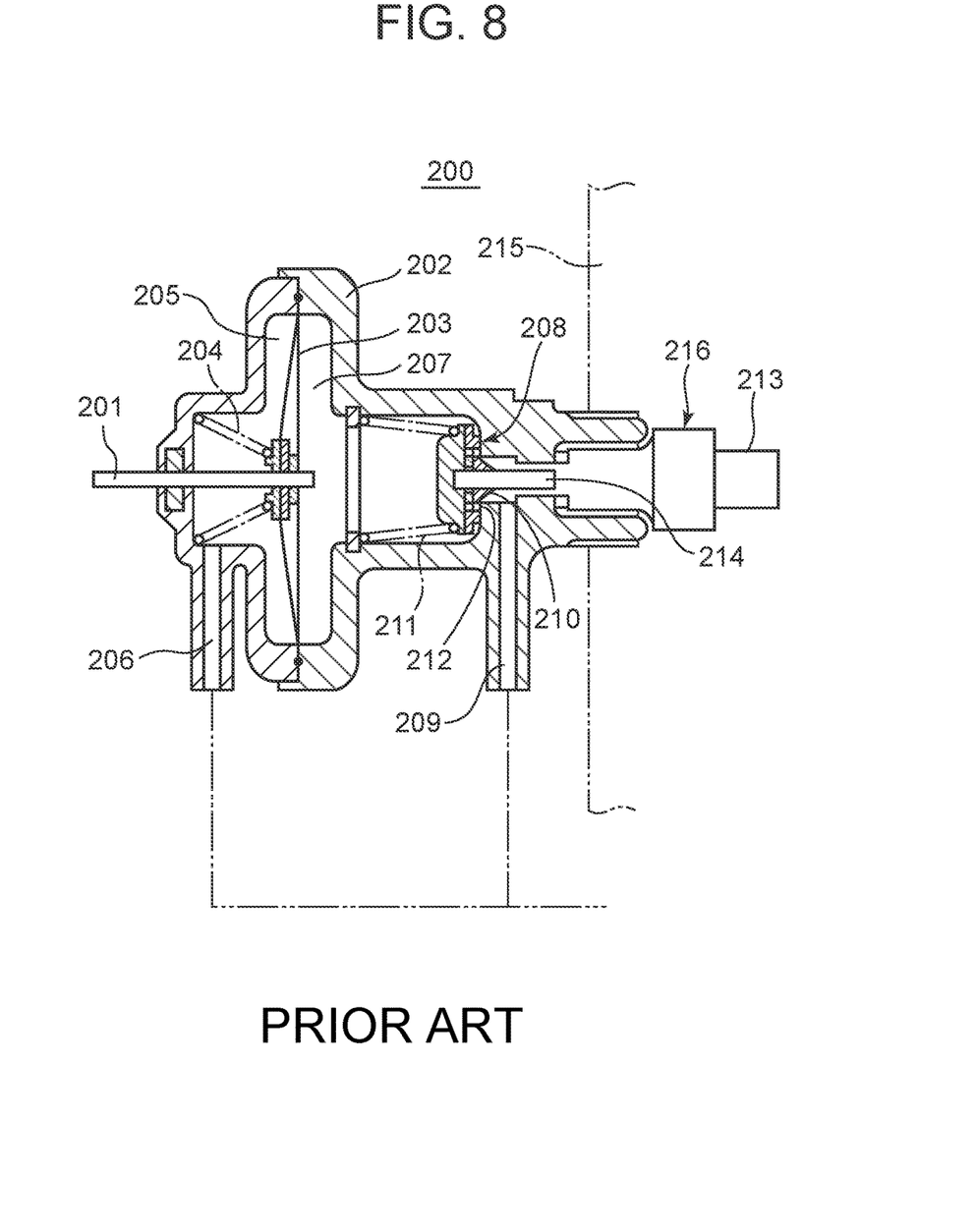
FIG. 8 is a cross-sectional view of a conventional thermoactuator.

A thermoactuator is known in which a shaft is moved back and forth by expansion and contraction of wax contained in a case induced by changes in temperature. Moreover, conventionally, using this thermoactuator as a drive source for an automobile radiator shutter has been proposed. For example, in Patent Document 1 a ventilation shutter device equipped with a thermoactuator and capable of responding immediately to sudden changes in engine load is disclosed. FIG. 8 is a cross-sectional view of the ventilation shutter device disclosed in Patent Document 1.

The ventilation shutter device 200 illustrated in FIG. 8 is one that opens and closes a shutter (not illustrated) connected to the tip of a shaft 201 (on the left in the drawing) as the shaft moves back and forth. The shutter opens a radiator ventilation duct when cooling the engine and at all other times keeps the ventilation duct closed, and so is provided so as to be openably closable within the ventilation duct.

As illustrated in the drawing, the ventilation shutter device 200 is constructed so that the rear end of the shaft 201 (the end on the right in the drawing) is connected to a diaphragm 203 disposed within a case 202, and is biased rearward by a spring 204. In front of the diaphragm 203 an empty chamber 205 is formed that is connected to the engine intake manifold (not illustrated) by a pipe 206. In back of the diaphragm 203 another empty chamber 207 is formed that also is connected to the engine intake manifold through a valve 208 and another pipe 209.

The valve 208 is constructed so that a substantially conical valve stem 210 is pressed against a valve seat 212 formed on the case 202 by a spring 211. When a thermo-element 213 mounted on the rear end of the case 202 and disposed inside a radiator 215 is heated, a thermal expansion material such as wax housed within the thermo-element 213 expands and pushes out a piston 214, and this piston 214 pushes against the valve stem 208 and pushes the valve stem away from the valve seat 212 to open the valve. It should be noted that a thermoactuator 216 is configured as a mechanism that contains the piston 214 and the thermo-element 213 that causes the piston to move back and forth.

In the ventilation shutter device 200 configured as described above, when the engine load is small and the radiator 215 coolant temperature is low, the valve 208 closes and negative pressure of the intake manifold reduces the pressure inside the chamber 205, drawing the diaphragm 203 toward it, so that the shaft 201 protrudes outward (the shutter is in a closed state). By contrast, when the engine load suddenly increases, although the temperature of the coolant in the radiator 215 is still low, with the engine throttle wide open the negative pressure of the intake manifold decreases. As a result, the pressure of the chamber 205 increases, the force of the spring 204 pushes the shaft 201 back in as it pushes the diaphragm 203 into the chamber 207, and the shutter opens.

As the radiator 215 coolant temperature rises, the piston 214 of the thermoactuator 216 is pushed out, the valve 208 opens, the pressure becomes the same in both chambers 205, 207, and the diaphragm 203 stops acting. Then, the force of the spring 204 causes the piston 201 to retract, opening the shutter. In other words, in the engine ventilation shutter device 200 is constructed in such a way that the shutter opens when the coolant temperature rises and when the coolant temperature is low, that is, when the intake manifold negative pressure decreases. In the engine ventilation shutter device 200 disclosed in Patent Document 1 in this manner, the opening and closing of the shutter for the purpose of controlling the ventilation is implemented using the thermoactuator 216.

PRIOR ART DOCUMENTS

Patent Document

Patent Document 1: JP-S62-168918-A

SUMMARY OF THE INVENTION

Technical Problem

Figure 9:
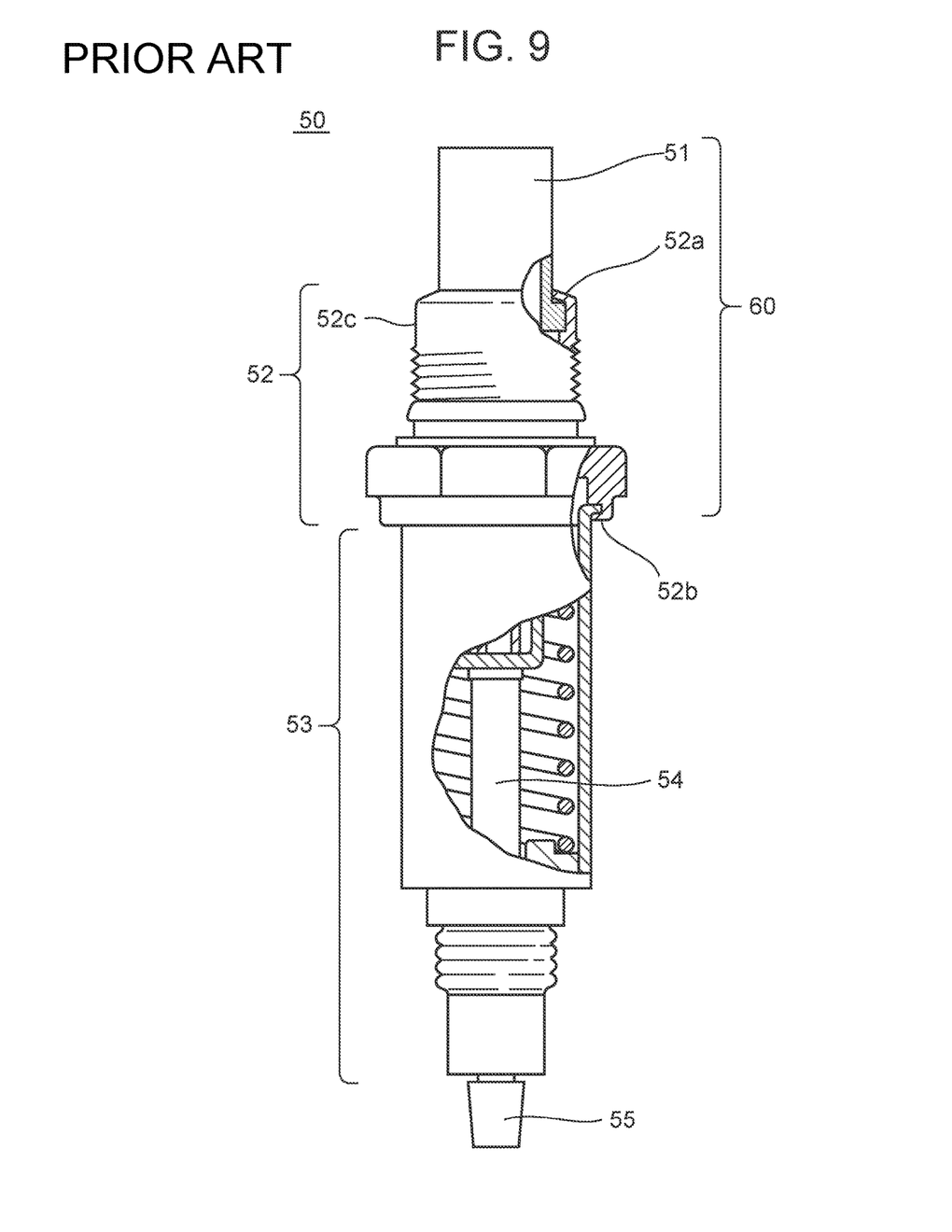
FIG. 9 is a front view of a configuration example in a case in which the supporting portion that supports the element case that contains wax, screwed onto and fixed in place on an engine.

However, the applicants have applied for patents on a thermoactuator that causes a shaft to move back and forth as wax expands and contracts due to changes in temperature like the thermoactuator 216 disclosed in Patent Document 1 (patent application no. 2012-103707). FIG. 9 is a front view of the exterior of a casing adaptable to that thermoactuator (partially cut away for ease of explanation). The thermoactuator 50 has an element case 51 (a heat-sensitive portion) that contains wax that expands and contracts with changes in temperature, a supporting portion 52 that supports the element case 51, and a cylinder portion 53 connected to the bottom end of the supporting portion 52. It should be noted that a thermo-element 60 is constructed of the element case 51 and the supporting unit 52. It is this thermo-element 60 that converts changes in temperature into lift (shaft movement).

The thermoactuator 50 has a rod 54 capable of advancing and retreating along the axis inside the thermoactuator 50 from the supporting portion 52 to the cylinder portion 53. As the wax inside the element case 51 expands and contracts with changes in temperature, the rod 54 and a shaft 55 connected to the tip of the rod 54 moves back and forth along the axis.

At this point, in the case of the thermoactuator 50 constructed in this manner being attached to on an engine, threads 52c are formed in the circumferential surface of the supporting portion 52 that supports the element case 51 as illustrated in the drawing and the supporting portion 52 of the thermo-element 60 is screwed onto the engine, so that the element case 51 is disposed inside the engine.

However, as illustrated in the drawing, the connection between the supporting portion 52 and the element case 51, as well as the connection between the supporting portion 52 and the cylinder portion 53, are accomplished by so-called crimping in which these portions are inserted into ends 52a, 52b of the supporting portion 52, and consequently there is a risk that the connections will not be secure. In other words, when the supporting portion 52 of the thermo-element 60 is screwed onto the engine, shearing stress (twisting) arises at the supporting portion 52 and there is a risk that the crimped end 52a of the supporting portion 52 deforms. When the crimped end 52a of the supporting portion 52 deforms, the element case 51 deforms and the container capacity is altered, or a gap appears and there is a risk that wax leaks from inside the element case 51. In that case, the operating characteristics of the thermo-element change, which has led to a problem of malfunctions.

Moreover, because the supporting portion 52 of the thermo-element 60 is attached to the engine by being screwed into the engine, the shaft 55 moves axially while rotating about its axis. As a result, it is difficult to position the shaft 55 at its ultimate setting. In addition, when screwing the supporting portion 52 into position it is common to use an O ring between it and the engine to increase airtightness, but the rotation of the screw risks twisting and breaking the O ring.

Moreover, when attaching the supporting portion 52 to the engine by screwing it into the engine, because the thermoactuator 50 is exposed to the outside except for the element case 51 and the screwed-in portion of the supporting portion 52, for example, corrosion of the thermo-element 60, which is mostly made of brass, and the cylinder portion 53 has proceeded from the exposed portion. Further, because the supporting portion 52 of the thermo-element 60 is directly screwed onto the engine and attached, engine vibrations are transmitted directly to the thermoactuator 50, risking loosening of the attachment.

The present invention is conceived in light of the above-described points, and has as its object to provide a thermoactuator that moves a shaft back and forth by the expansion and contraction of wax and an attachment structure thereof that can be easily attached to an attachment object without compromising the operating characteristics of the thermo-element.

Solving the Technical Problem

To solve the above-described problem, the thermoactuator according to the present invention comprises an element case, containing wax that expands and contracts with changes in temperature; a supporting portion attached at one end to the element case by crimping, slidably supporting a shaft at another end; a cylindrical casing having an opening in one end, at least a portion of the supporting portion pressed through the opening in the one end of the cylindrical casing; and a flange expanding outward from the one end of the cylindrical casing, in which through-holes are formed for mounting the thermoactuator to an object to which the thermoactuator is to be attached, the element case supported by one end of the supporting portion housed within the object to which the thermoactuator is to be attached, the casing mounted on the object via the flange. Preferably, a guard is formed that projects outward from a periphery of the supporting portion, wherein a portion around an opening in one end of the casing contacts one face of the guard.

With such a configuration, when the thermoactuator is attached to the engine, since there is no need to rotate the thermoactuator (the supporting portion) about its axis, there is no shearing stress (twisting) on the supporting portion. Moreover, the rear of the supporting portion crimped to the element case is separated from the front of the supporting portion pressed into the casing, so there is no deformation of the crimped portion when the supporting portion is pressed into the casing. In other words, even though the element case and the supporting portion are connected by being crimped together, installation of the thermoactuator in the engine 30 can be carried out without compromising the operating characteristics of the thermo-element 9. In addition, the connection between the supporting portion 5 of the thermo-element 9 and the casing 10 is accomplished not by crimping but by pressing the supporting portion 5 into the casing 10, thus facilitating assembly.

Further, in order to solve the above-described problem, a thermoactuator attachment structure for the thermoactuator comprises a housing compartment having an opening therein, capable of housing the element case, formed in the object to which the thermoactuator is to be attached and having a tapered portion at a rim of the opening of decreasing diameter of the opening; and an O ring provided between the tapered portion and the guard of the supporting portion, with the element case supported by the supporting portion disposed within the housing compartment and the supporting portion contacted against the tapered portion and the casing mounted on the object to which the thermoactuator is to be attached via the flange.

With such an attachment structure, when attaching the thermoactuator to the engine, the position of the thermo-element inside the housing compartment is set, and thus the position of the shaft can also be set easily as well. Since the thermoactuator is mounted on the engine via the flange of the casing, any diameter of screw used to install the thermoactuator can be used, for example screws of a size that fits the screw hole without regard to the size of the thermo-element. By mounting the thermoactuator at multiple points, loosening of the thermoactuator can be prevented.

The thermo-element is contained within the casing and the housing compartment and has no portion that is exposed to the outside. Therefore, corrosion of the brass-built thermo-element can be prevented. Moreover, when installing the thermoactuator in the engine, the supporting portion is not rotated about its axis. Therefore, only pressure in the back-and-forth direction is exerted on the O ring disposed between the back surface of the guard of the supporting portion and the tapered portion of the housing compartment. As a result, rupture of the O ring due to twisting and the like can be prevented.

Further, in attaching the thermoactuator to the engine, the supporting portion of the thermo-element is contacted against the tapered portion and the flange of the casing is screwed onto the attachment surface of the engine. As a result, the tolerances of the contact surface of the tapered portion and the roughness of the attachment surface or the like, and the centering of the housing compartment and the thermo-element that is housed within it, or of the through-holes and the screw holes, need not be very accurate, thus enabling costs to be reduced by an equivalent amount. Moreover, because there is no need for a screw engagement portion (a screw cutting part) at the supporting portion for attachment to the engine as is conventionally the case, the axial length of the supporting portion can be shorted, thereby allowing the thermoactuator as a whole to be made more compact. It should be noted that the thermoactuator attachment structure is configured to cause the wax to move back and forth in an axial direction of the shaft with expansion and contraction of the wax, and is adapted to drive a shutter of a ventilation duct of a radiator of an engine.

Effects of the Invention

According to the present invention, a thermoactuator that moves a shaft back and forth by the expansion and contraction of wax and an attachment structure thereof that can be easily attached to an attachment object without compromising the operating characteristics of the thermo-element.

DETAILED DESCRIPTION OF EMBODIMENTS OF THE INVENTION

A description is now given of embodiments of a thermoactuator and an attachment structure thereof according to the present invention. In the present embodiment, the thermoactuator is attached to an attachment object such as an automobile engine, for example, and functions as a drive source for a shutter that opens and closes a ventilation duct of a radiator. It should be noted that, in the description of the drawings below, the shaft side of the thermoactuator connected to the shutter (to the left in the drawings) is the front side.

Figure 1:
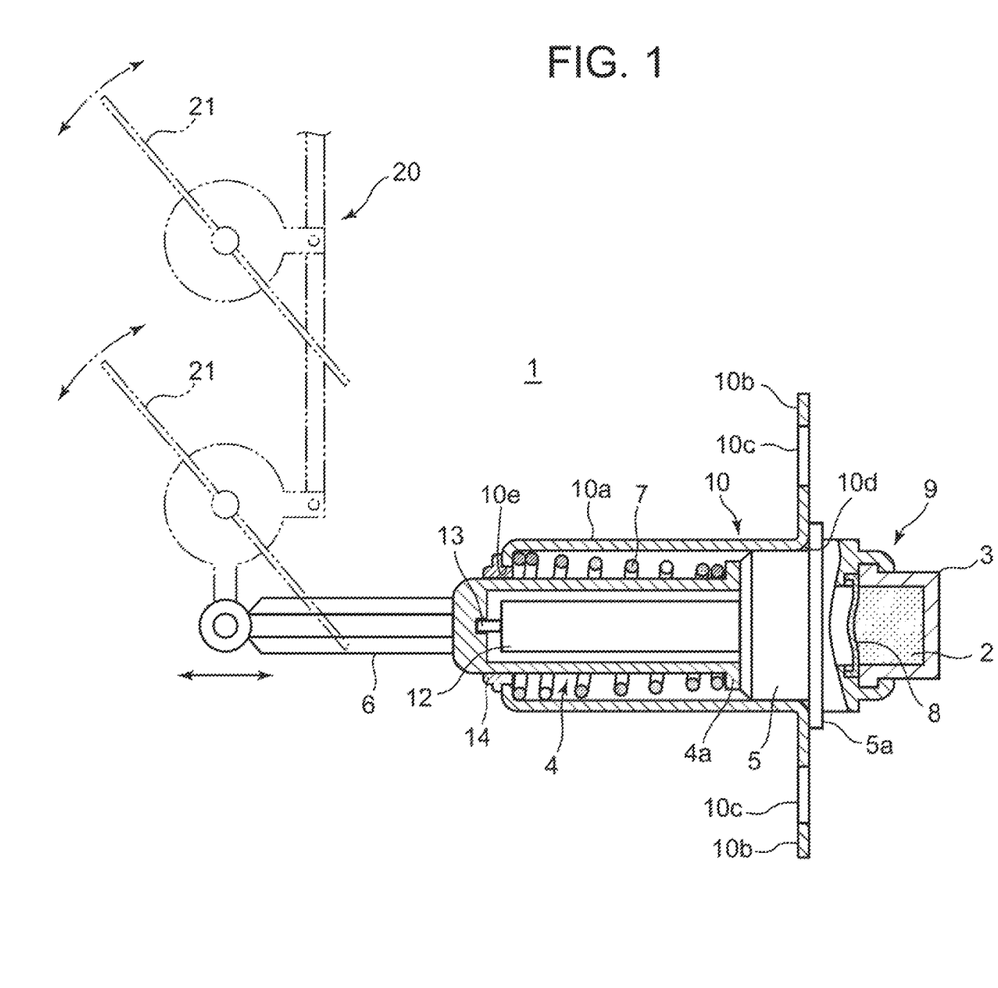
FIG. 1 is a cross-sectional view of a thermoactuator according to the present invention.
Figure 2:
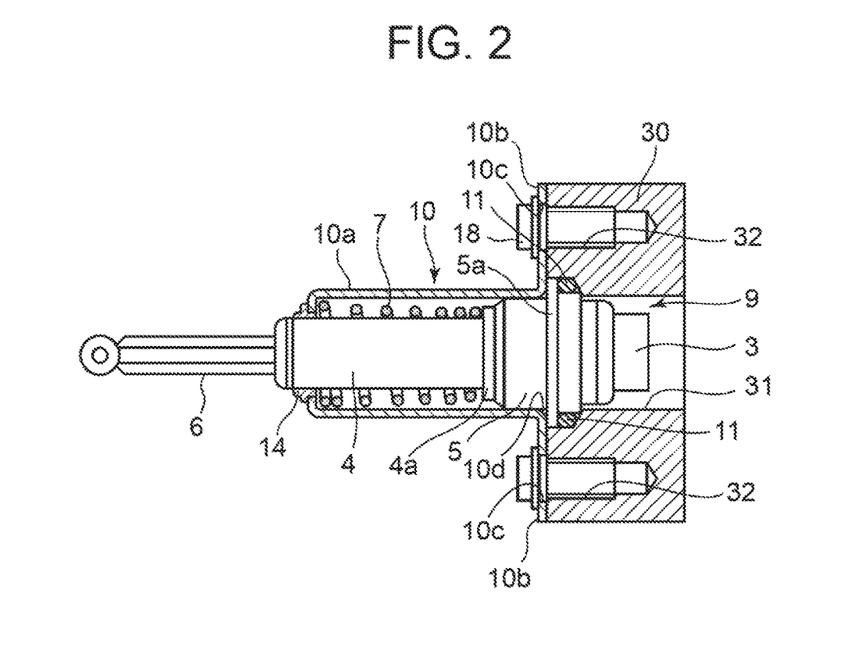
FIG. 2 is a cross-sectional view of the thermoactuator of FIG. 1 attached to an engine, showing a state in which the retainer is retracted farthest from the thermo-element.
Figure 3:
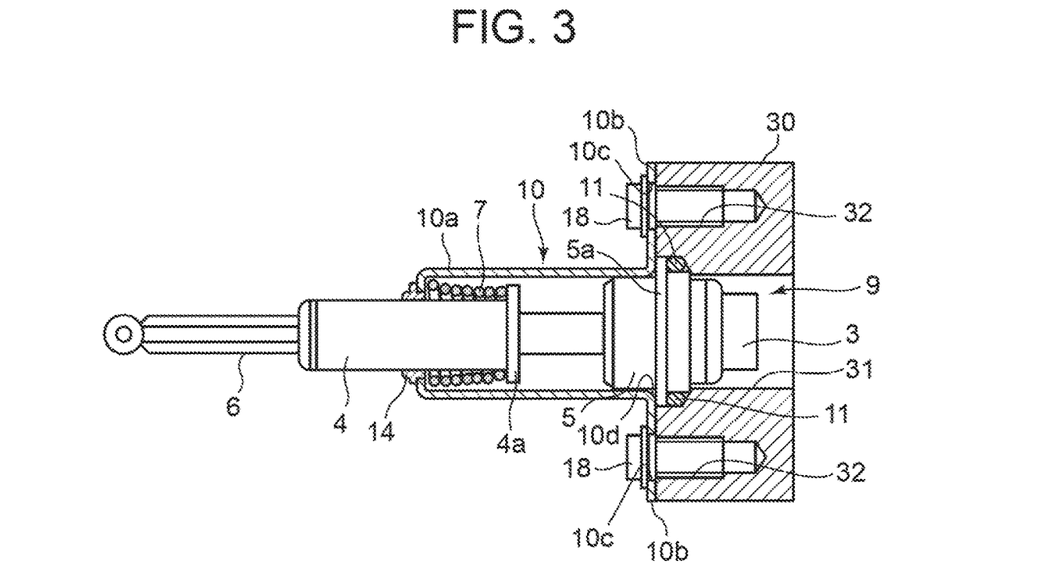
FIG. 3 is a cross-sectional view of the thermoactuator of FIG. 1 attached to an engine, showing a state in which a retainer is at its closest approach to the thermo-element.

FIG. 1 is a cross-sectional view of a thermoactuator 1 according to the present invention. FIG. 2 is a cross-sectional view of the thermoactuator 1 of FIG. 1 attached to an engine 30, showing a state in which the shaft is retracted farthest from the thermo-element, and FIG. 3 shows a state in which the shaft is at its closest approach to the thermo-element. The thermoactuator 1 illustrated in the drawings is provided with an element case 3 that contains wax 2 and a supporting portion 5 that supports the element case 3 on a rear side and holds on its front side a retainer 4 in such a way as to allow the retainer 4 to move back and forth. The element case 3 and the supporting portion 5 are attached together by crimping to form a thermo-element 9, and at this thermo-element 9 changes in temperature are converted into lift (movement of the retainer 4). It should be noted that the thermo-element 9 (the element case 3 and the supporting portion 5) is made of brass, for example.

The element case 3 is a cylindrical shape with a closed rear end, in which wax 2 that has the property of expanding when the temperature rises and contracting when the temperature falls is contained. A diaphragm 8 that deforms with the expansion and contraction of the wax 2 is mounted on the open front end of the element case.

The retainer 4, as illustrated in FIG. 1, encloses a substantially cylindrical guide unit 12 formed as a single integrated unit with the supporting portion 5. Inside the guide unit 12 a substantially columnar piston 13 is held so as to be able to move back and forth (in the axial direction). By moving back and forth with respect to the guide unit 12 in response to deformation of the diaphragm 8, the piston 13 moves the retainer 4 back and forth.

The thermoactuator 1 is provided with a shaft 6 that is disposed coaxially with the retainer 4 and which protrudes from the tip of the retainer 4. As illustrated in FIG. 1, the tip of the shaft 6 is connected to a switching mechanism 20 for a plurality of shutters 21, and moves back and forth in the axial direction in synch with the back-and-forth movement of the retainer 4 to link together the plurality of shutters 21 and cause them to rotate (open and close).

A cylindrical casing 10 is provided so as to enclose the retainer 4 and the supporting portion 5, and a return spring 7 that expands and compresses in the axial direction is disposed in a space between the retainer 4 and the casing 10. The front end of the return spring 7 is seated against the inside front end of the casing 10 and the back end of the return spring 7 is mounted on a guard 4a that projects outward from the back end of the retainer 4, so that the return spring 7 urges the retainer 4 and the shaft 6 in the rearward direction. That is, although the retainer 4 is constantly urged in the backward direction by the return spring 7, with respect to the thermo-element 9 the return spring 7 compresses when the retainer 4 advances.

More specifically, in the thermo-element 9, as the wax 2 inside the element case 3 expands, the diaphragm 8 inside the supporting portion 5 moves forward and, as illustrated in FIG. 3, the retainer 4 (the shaft 6) moves forward with respect to the thermo-element 9. At this time, the return spring 7 is in a compressed state. By contrast, when the wax 2 contracts, the diaphragm 8 inside the supporting portion 5 moves backward and at the same time the retainer 4 (the shaft 6) is urged in the rearward direction by the return spring 7 such that, when the wax 2 has completely contracted, as illustrated in FIG. 2, the retainer 4 (the shaft 6) is returned to its original position. It should be noted that an annular packing 14 is provided to an opening 10e in the front of the casing 10 and seals the casing 10 despite the backward and forward movement of the retainer 4.

The casing 10 includes a casing body 10a that surrounds the retainer 4 and thermo-element 9 and a flange 10b spreading outward in a ring from the back end of the casing body 10a. Through-holes 10c used to fasten the screws are provided in the flange 10b. As illustrated, the front of the supporting portion 5 is inserted from an opening 10d in the rear of the casing body 10a and the area around the opening 10d contacts one side (front side) of a guard 5a projecting outward from the periphery of the supporting portion 5. It should be noted that the guard 5a may be formed as a single integrated unit with the body of the supporting portion 5, or it may be formed as a separate body by engaging a washer on a step formed on the periphery of the supporting portion 5.

Figure 4:
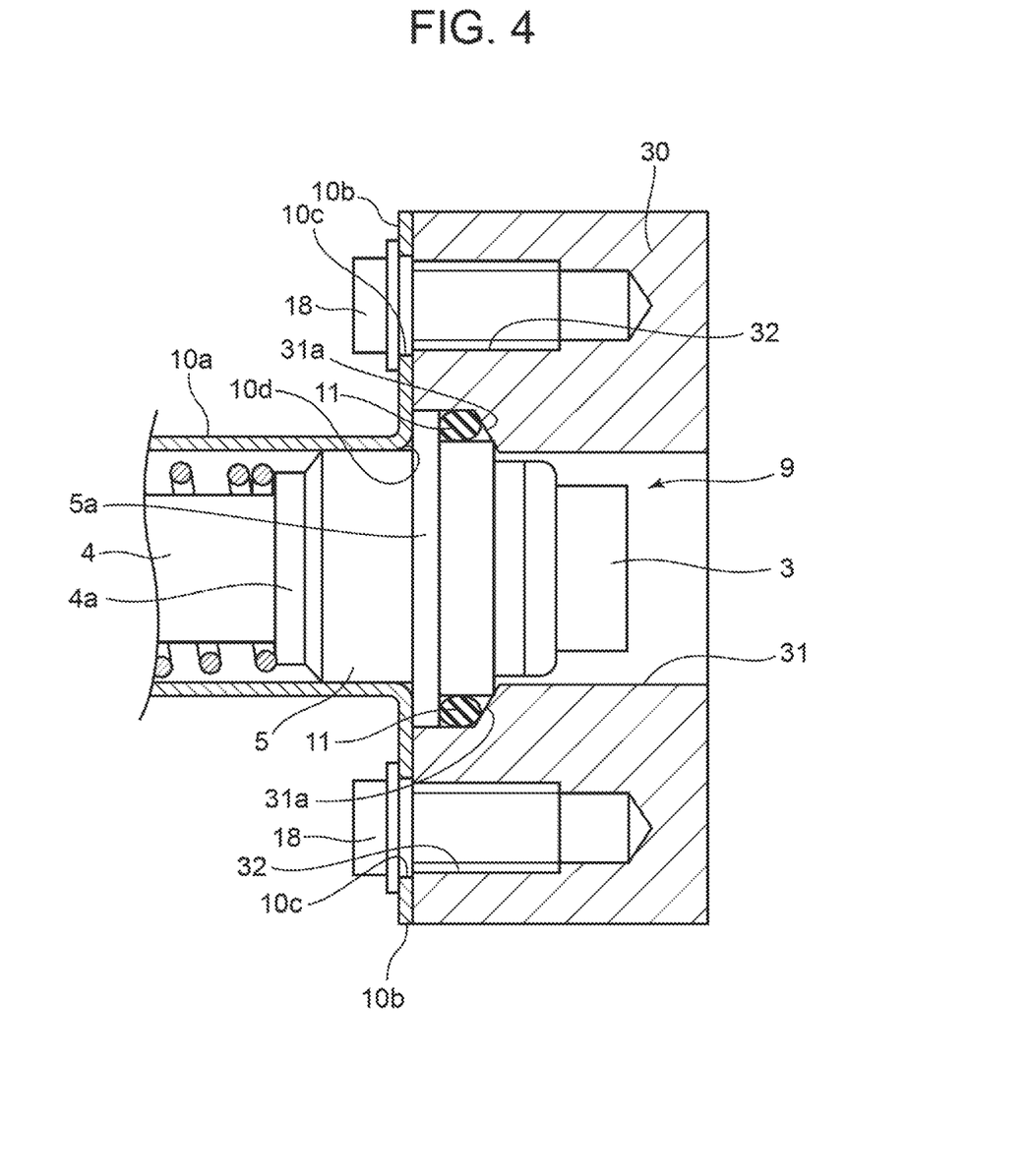
FIG. 4 is a cross-sectional view showing an enlarged view of an attachment portion for installation of the thermoactuator on an engine.

Continuing, a description is given of attachment of the thermoactuator 1 to an automobile engine using FIG. 4. FIG. 4 is a cross-sectional view showing an enlarged view of an attachment portion for installation of the thermoactuator on an engine 30. In attaching the thermoactuator 1, as illustrated in FIG. 4 a housing compartment 31 having a size large enough to accommodate the element case 3 and the supporting portion 5 of the thermo-element 9 and screw holes 32 for screwing the casing 10 in place are pre-formed in the engine 30. In addition, as illustrated in FIG. 4 a tapered portion 31*a* that slants at a predetermined angle is formed on the rim of the opening of the housing compartment 31 so as to give the opening a decreasing diameter.

The thermo-element 9, retainer 4 and shaft 6 are connected and the return spring 7 is disposed so as to surround the outside of the retainer 4. The front of the supporting portion 5 of the thermo-element 9 is pressed into place through the opening 10*d* in the rear of the casing 10 and the front of the guard 5*a* of the supporting portion 5 is contacted against the area around the opening 10*d* of the casing body 10*a*. By so doing, the casing 10 and the thermo-element 9 are put into a state of connection.

Here, as illustrated in FIG. 1 the rear portion of the thermo-element 9 including the element case 3 projects farther rearward than the flange 10*b* does, and it is this portion that is inserted into the housing compartment 31 in the engine 30. At this time, as illustrated in FIG. 4, an O ring 11 is disposed in the space formed between the back surface of the guard 5*a* of the supporting portion 5 and the tapered portion 31*a* of the housing compartment 31, and the supporting portion 5 is contacted against the tapered portion 31*a*.

The supporting portion 5 is contacted against the tapered portion 31*a*, the guard 5*a* of the supporting portion 5 is pressed against the engine 30 by the flange 10*b* of the casing 10, the through-holes 10*c* on the flange 10*b* and the screw holes 32 in the engine 30 are aligned, and screws 18 are screwed into the screw holes 32 from the through-holes 10*c*. With this, the casing 10 of the thermoactuator 1 is mounted on the engine 30 and fixed in place in the back-and-forth direction by the supporting portion 5 being contacted against the tapered portion 31*a*, thus preventing the thermo-element 9 from dropping out of the casing 10

Figure 5:
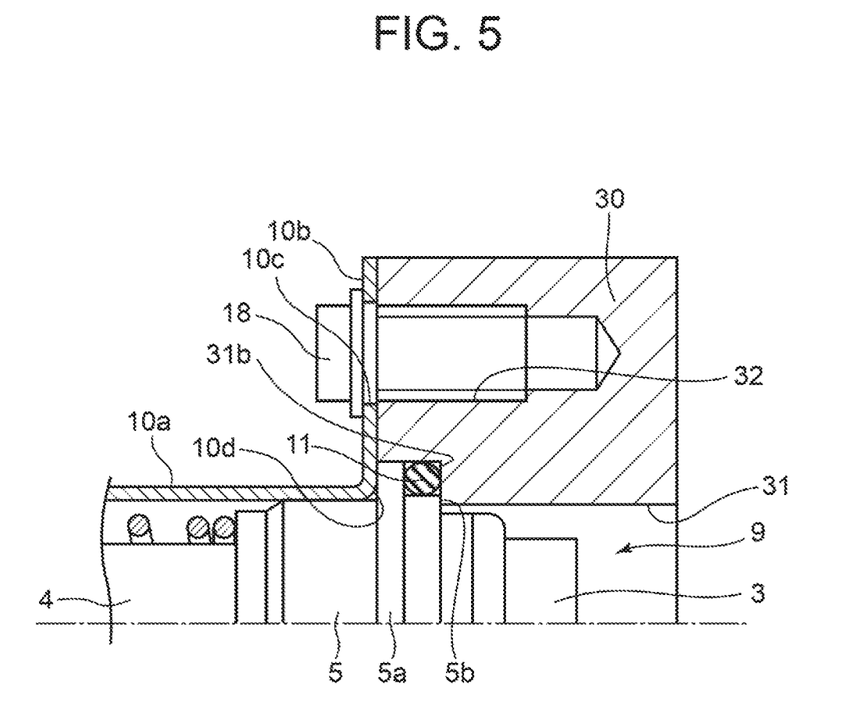
FIG. 5 is a cross-sectional view of an example of an undesirable configuration of a housing compartment in an attachment object.

If, as illustrated in FIG. 5, not a tapered portion but a stepped portion 31*b* parallel to the attachment face is formed in the housing compartment 31, the guard 5*a* of the supporting portion 5 must be contacted against the flange 10*b* of the casing 10 and the stepped portion 5*b* of the outer periphery of the supporting portion 5 must be contacted flat against the stepped portion 31*b*. However, in the case of a configuration in which it is necessary for the supporting portion 5 to have two contact faces, the contact surface between the guard 5*a* and the flange 10*b*, and the contact surface between stepped portion 5*b* and the stepped portion 31*b* must be formed parallel to each other. Further, it is necessary to manage the dimensional distance between these two contact surfaces carefully. As a result, as illustrated in FIG. 4, it is preferable to provide not a stepped portion 31*b* but a tapered portion 31*a* to the housing compartment 31 and to form the contact with the stepped portion 5*b* of the supporting portion 5 not as a surface but as a line, to provide freedom of positioning of the contact.

According to the above-described embodiment of the present invention, the front of the supporting portion 5 of the thermo-element 9 is pressed into and mounted in the casing 10 and at the same time the element case 3 and the rear of the supporting portion 5 that supports it is inserted in the housing compartment 31 formed in the engine 30. The rear of the supporting portion 5 inserted in the housing compartment 31 contacts the tapered portion 31*a* formed on the rim of the housing compartment 31 and the flange 10*b* of the casing 10 is screwed in place on the engine in a state in which the guard 5*a* of the supporting portion 5 is pressed against the engine 30, thus positioning the thermo-element 9 in place.

With this configuration, when the thermoactuator 1 is attached to the engine 3, since there is no need to rotate the thermoactuator 1 (the thermo-element 9) about its axis, there is no shearing stress (twisting) on the thermo-element 9. Moreover, the rear of the supporting portion 5 crimped to the element case 3 is separated from the front of the supporting portion 5 pressed into the casing 10, so there is no deformation of the crimped portion when the supporting portion 5 is pressed into the casing 10. In other words, even though the element case 3 and the supporting portion 5 are connected by being crimped together, installation of the thermoactuator 1 in the engine 30 can be carried out without compromising the operating characteristics of the thermo-element 9. In addition, the connection between the supporting portion 5 of the thermo-element 9 and the casing 10 is accomplished not by crimping but by pressing the supporting portion 5 into the casing 10, thus facilitating assembly. Moreover, because there is no need for a screw engagement portion (a screw cutting part) at the supporting portion 5 for attachment to the engine as is conventionally the case, the axial length of the supporting portion 5 can be shorted, thereby allowing the thermoactuator 1 as a whole to be made more compact.

When attaching the thermoactuator 1 to the engine 30, the position of the thermo-element 9 inside the housing compartment 31 is set, and thus the position of the shaft 6 can also be set easily as well. Since the thermoactuator 1 is mounted on the engine 30 via the flange 10*b* of the casing 10, any diameter of screw used to install the thermoactuator 1 can be used, for example screws of a size that fits the screw hole 32 without regard to the size of the thermo-element 9. By mounting the thermoactuator 1 at multiple points, loosening of the thermoactuator 1 can be prevented.

The thermo-element 9 is contained within the casing 10 and the housing compartment 31 and has no portion that is exposed to the outside. Therefore, corrosion of the brass-built thermo-element 9 can be prevented. Moreover, when installing the thermoactuator 1 in the engine 30, the supporting portion 5 is not rotated about its axis. Therefore, only pressure in the back-and-forth direction is exerted on the O ring disposed between the back surface of the guard 5*a* of the supporting portion 5 and the tapered portion 31*a* of the housing compartment 31. As a result, rupture of the O ring 11 due to twisting and the like can be prevented.

Further, in attaching the thermoactuator 1 to the engine 30, the supporting portion 5 of the thermo-element 9 is contacted against the tapered portion 31*a* and the flange 10*b* of the casing 10 is screwed onto the attachment surface of the engine 30. As a result, the tolerances of the contact surface of the tapered portion 31*a* and the roughness of the attachment surface or the like, and the centering of the housing compartment 31 and the thermo-element 9 that is housed within it, or of the through-holes 10*c* and the screw holes 32, need not be very accurate, thus enabling costs to be reduced by an equivalent amount.

Figure 6A:
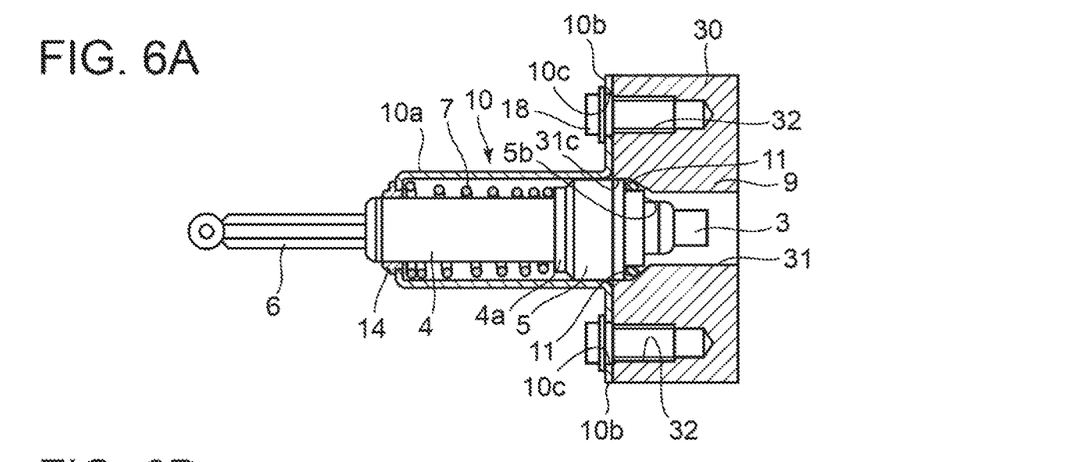
FIGS. 6A, 6B, and 6C are cross-sectional views of a variation of the thermoactuator according to the present invention.
Figure 6B:
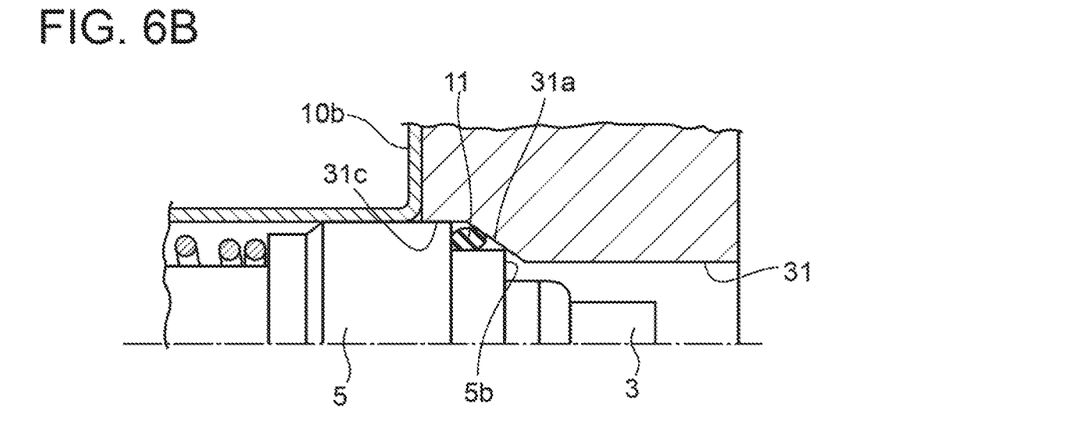
Figure 6C:
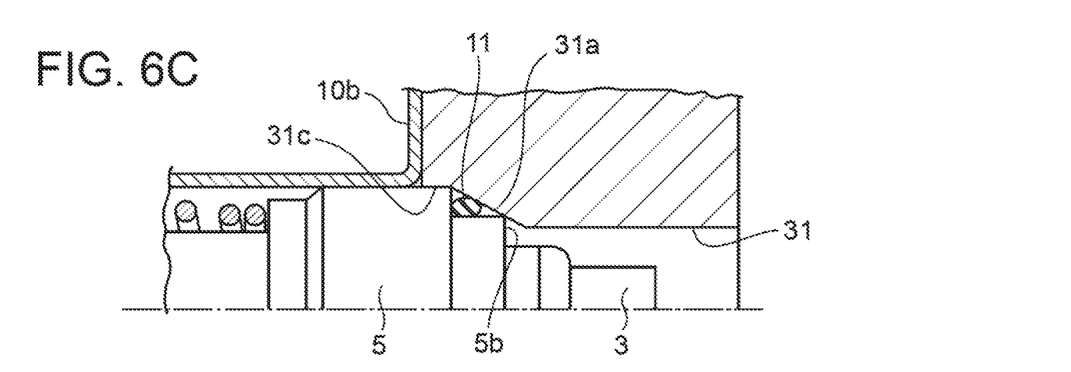

Although in the above-described embodiment the guard 5*b* is provided to the periphery of the supporting portion 5, in the thermoactuator according to the present invention that configuration is not limited thereto. For example, as illustrated in FIG. 6A, without providing a guard 5a on the periphery of the supporting portion 5, a portion of the supporting portion 5 may be inserted into the straight hole 31c extending from the rim of the housing compartment 31 to the tapered portion 31a (the portion opening perpendicular from the attachment surface). At that time, as illustrated in expanded view in FIG. 6B, the angled edge of the stepped portion 5b may be contacted against the tapered portion without inserting the supporting portion 5 all the way into the deepest part of the straight hole 31c. With such a configuration, the part of the thermoactuator 1 that contacts the object to which it is to be attached can be made to be the two locations consisting of the flange 10b and the angle of the stepped portion 5b. Alternatively, as illustrated in the enlarged view of FIG. 6C, the supporting portion 5 may be inserted all the way into the deepest part of the straight hole 31c, in which case, since the supporting portion 5 contacts the deepest part of the straight hole 31c and the top of the tapered portion 31a (i.e., at two places), together with the flange 10b the thermoactuator 1 contacts the object to which it is to be attached at a total of three locations.

Figure 7:
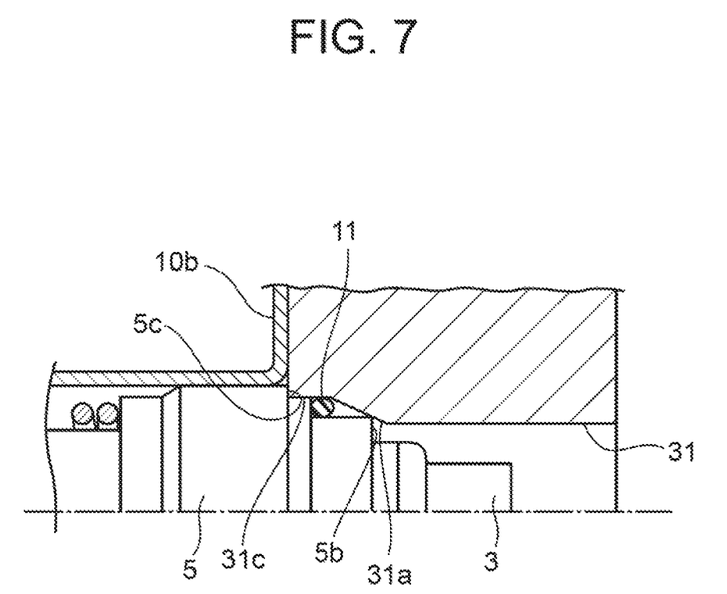
FIG. 7 is a cross-sectional view of another variation of the thermoactuator according to the present invention.

As illustrated in FIG. 7, insertion of the supporting portion 5 into the straight hole 31c of the housing compartment 31 the stepped portion 5c on the periphery of the supporting portion 5 may be configured to contact the flange 10b together with the attachment surface. In this case, the stepped portion 5b on the supporting portion 5 inserted into the housing compartment 31 may be contacted against the tapered portion 31a as illustrated in the drawing.

The embodiment described above is configured so that the tip of the shaft 6 of the thermoactuator 1 connects to the switching mechanism 20 of the shutter 21 and opens and closes the shutter 21 as the shaft 6 moves back and forth. However, the thermoactuator 1 according to the present invention is not limited to such a configuration. Thus, for example, the thermoactuator of the present invention is also applicable to a configuration like that illustrated in FIG. 5, in which a mechanism that opens and closes the shutter using intake manifold pressure is inserted between the shaft 6 and the switching mechanism 20.

In the present embodiment, although the thermoactuator 1 is described as being used as a drive source of a shutter for opening and closing a ventilation duct of a radiator, the thermoactuator according to the present invention is not limited to such an application. Thus, for example, the thermoactuator of the present invention may be installed on an engine exhaust heat recovery device (not illustrated), in which case the element case 3 is disposed within the heat recovery device, causing the shaft to move back and forth with temperature changes inside the heat recovery device and switches exhaust ducts.

Although in the above-described embodiment an engine is described as the object to which the thermoactuator is attached, the object to which the thermoactuator is attached is not limited thereto and may be attached to any object of which the temperature is desired to be sensed. Thus, for example, like the thermoactuator described in Patent Document 1, the thermoactuator may be attached to a ventilation duct of the radiator. In other words, the thermoactuator and the attachment structure thereof are not limited to any particular object to which it is to be attached, and therefore is applicable to a variety of conventional thermoactuators.

LIST OF REFERENCE NUMBERS

1 Thermoactuator
2 Wax
3 Element case
4 Retainer
4a Guard
5 Supporting portion
6 Shaft
7 Return spring
8 Diaphragm
9 Thermo-element
10 Casing
10a Casing body
10b Flange
10c Through-hole
10d Opening
11 O ring
12 Guide unit
13 Piston
14 Packing
18 Screw
30 Engine (attachment object)
31 Housing compartment
32 Screw hole

What is claimed is:

1. A thermoactuator attachment structure for a thermoactuator, the thermoactuator comprising:
an element case, containing wax that expands and contracts with changes in temperature;
a supporting portion attached at one end to the element case by crimping, slidably supporting a shaft at another end;
a cylindrical casing having an opening in one end, at least a portion of the supporting portion pressed through the opening in the one end of the cylindrical casing; and
a flange expanding outward from the one end of the cylindrical casing, in which through-holes are formed for mounting the thermoactuator to an object to which the thermoactuator is to be attached,
the element case supported by one end of the supporting portion housed within the object to which the thermoactuator is to be attached, the casing mounted on the object via the flange,
the thermoactuator further comprising a guard that projects outward from a periphery of the supporting portion, wherein a portion around the opening in one end of the casing contacts one face of the guard,
the thermoactuator attachment structure comprising:
a housing compartment having an opening therein, capable of housing the element case, formed in the object to which the thermoactuator is to be attached and having a tapered portion at a rim of the opening of decreasing diameter of the opening; and
an O ring provided between the tapered portion and the guard of the supporting portion,
the element case supported by the supporting portion disposed within the housing compartment, with the supporting portion contacted against the tapered portion and the casing mounted on the object to which the thermoactuator is to be attached via the flange.

2. The thermoactuator attachment structure of claim 1, configured to cause the shaft to move back and forth in an axial direction of the shaft with expansion and contraction of the wax to drive a shutter of a ventilation duct of a radiator of an engine.

* * * * *